United States Patent [19]
Togashi

[11] Patent Number: 5,812,329
[45] Date of Patent: Sep. 22, 1998

[54] PICKUP SYSTEM

[75] Inventor: Mitsuhiro Togashi, Miyagi-ken, Japan

[73] Assignee: Alps Electric Co., Ltd., Japan

[21] Appl. No.: 856,269

[22] Filed: May 14, 1997

[30] Foreign Application Priority Data

May 24, 1996 [JP] Japan .................................. 8-130079

[51] Int. Cl.⁶ .................................................. G02B 7/02
[52] U.S. Cl. ........................................................ 359/822
[58] Field of Search ................................... 359/824, 821, 359/822, 823, 819, 813, 814; 369/44.19

[56] References Cited

U.S. PATENT DOCUMENTS

| | | | |
|---|---|---|---|
| 4,531,831 | 7/1985 | Kitajima et al. | 355/57 |
| 4,901,107 | 2/1990 | Iwamoto et al. | 355/55 |
| 5,615,204 | 3/1997 | Watanabe et al. | 369/247 |

FOREIGN PATENT DOCUMENTS 6-215383  8/1994  Japan .

*Primary Examiner*—Georgia Y. Epps
*Assistant Examiner*—Ricky Mack
*Attorney, Agent, or Firm*—Brinks Hofer Gilson & Lione

[57] ABSTRACT

A pickup system including a carriage with an objective lens mounted thereon, a drive mechanism for moving the carriage radially of a disk along first and second shafts arranged in parallel, and a cutout formed in an engaging portion of the carriage which engaging portion is for engagement of the carriage with the second shaft, the cutout being somewhat inclined relative to the disk surface. By adjusting the position at which the cutout of the engaging portion is to be contacted with the second shaft, the carriage is moved pivotally about the first shaft according to the so-adjusted position to adjust the inclination of the optical axis of the objective lens.

3 Claims, 3 Drawing Sheets

PICKUP SYSTEM

BACKGROUND OF THE INVENTION

The present invention relates to a pickup system and more particularly to a pickup system capable of adjusting the inclination of an optical axis of an objective lens relative to an optical disk such as, for example, CD (compact disk) or CD-ROM (read-only type compact disk) in reading information from the optical disk.

Generally, in an optical disk unit, there are used an optical disk such as, for example, CD or CD-ROM and a pickup system for reading information recorded on the optical disk. The pickup system comprises a light emitting element for emitting a laser beam to recording pits on the optical disk, a light receiving element for receiving the laser beam reflected from the recording pits on the optical disk through an optical system, an automatic focusing mechanism for focusing the optical system, a carriage which carries thereon the light emitting element, the light receiving element and the automatic focusing mechanism, a moving and guiding mechanism for moving and guiding the carriage radially of the optical disk, and a tracking mechanism which performs a fine positioning of the carriage relative to a track position on the optical disk.

FIG. 4 is a plan view showing an example of construction of such a known pickup system.

As shown in FIG. 4, the pickup system is provided with a chassis 41, a first shaft 42(1) and a second shaft 42(2) which are arranged in parallel on both sides of the chassis 41, and a carriage engaged with both the first shaft 42(1) and the second shaft 42(2). The carriage 43 carries thereon an optical system, including an objective lens 44, and a focus/tracking mechanism (F/T) 45. The focus/tracking mechanism 45 has a F/T coil 46 and a magnet (not shown). The engagement of the carriage 43 with the first shaft 42(1) is effected by a threaded coil 47 provided on the carriage side and fitted on the first shaft, while the engagement of the carriage 43 with the second shaft 42(2) is effected by an engaging portion 48 provided on the carriage. To both ends of the first shaft 42(1) is fixed a front end portion of a turned square U-shaped back yoke 49. A rod-like magnet 50 is attached to the inside of a body portion of the back yoke 49. The portion comprising the first shaft 42(1), threaded coil 47, back yoke 49 and rod-like magnet 50 constitutes a linear motor.

In the pickup system of the above construction, when an electric current is supplied to the threaded coil 47, the carriage 43 having the threaded coil 47 is moved and guided along the first shaft 42(1) and the second shaft 42(2) in accordance with the polarity of the electric current. With this movement of the carriage 43, the optical system carried on the carriage, as well as the carriage, moves in steps (for example, in steps of 0.1 to 0.05 mm) and thus a coarse feed is performed. When an electric current is supplied to the F/T coil 46 after the step movement of the optical system, a focus/tracking adjustment, or a fine feed, is performed by a positional shift of the objective lens 44 in the optical system.

In reading information recorded on the optical disk in the above known pickup system, it is necessary that the optical axis of the objective lens 44 and the disk surface be rendered orthogonal to each other for avoiding the occurrence of coma-aberration of the objective lens 44 in the optical system. However, there is a possibility that the optical axis of the objective lens 44 does not intersect the optical disk surface perpendicularly, for example due to a slight inclination of the optical disk resting surface.

In view of this point there already has been developed a pickup system which is provided with a mechanism for adjusting the inclination of an objective lens to maintain the optical axis of the objective lens and the optical disk surface in a perpendicularly intersecting condition at all times. An example of such a pickup system is disclosed in Japanese Patent Laid Open No. 215383/1994.

In the pickup system disclosed in the unexamined publication, the first means used therein is concerned with a device for adjusting the inclination of an objective lens in which the bottom of an objective lens resting table is made spherical. According to this device, the mounting position of the table is adjusted with a manually adjustable screw to render the optical axis of the objective lens and the disk surface orthogonal to each other. The second means used in the pickup system in question is concerned with a device for adjusting the inclination of an objective lens and being provided with a link mechanism having a pair of generally parallel links. According to this device, of the paired generally parallel links, the one closer to the disk is set in a fixed state, while the other link which is remote from the disk and carries thereon the objective lens and an objective lens driver, is set in an adjustable state. Further, a plurality of support links for connecting the fixed link and the adjustable link with each other are arranged in such a manner that a principal point of the objective lens passes on an extension line of the plural support links, allowing the optical axis of the objective lens to intersect the disk surface perpendicularly.

In the pickup system disclosed in the above Japanese Patent Laid Open No. 215383/1994, both the first and the second means, i.e., objective lens inclination adjusting devices, require a large number of components, thus giving rise to the problem that the construction of the pickup system becomes complicated or the manufacturing cost thereof increases. In addition, the first means involves the problem that the positional relation of the objective lens to light emitting and light receiving elements becomes disordered, thus exerting an adverse effect on the information reading characteristic of the pickup system.

SUMMARY OF THE INVENTION

The present invention has been accomplished for solving the above-mentioned problems and it is an object of the invention to provide a pickup system capable of adjusting the inclination of an optical axis of an objective lens without increase in the number of components and without any adverse effect on the information reading characteristic of the pickup system.

According to the present invention, in order to achieve the above-mentioned object, there is provided a pickup system comprising a carriage for holding an objective lens, moving and guiding members for moving and guiding the carriage, and an optical axis adjusting member which, when an engaging portion of the carriage and one of the moving and guiding members are to be engaged with each other, causes the position of the engaging portion of the carriage for engagement with the one moving and guiding member to be changed to adjust the inclination of an optical axis of the objective lens relative to the disk surface.

According to this construction, by changing the position of the carriage engaging portion for engagement with one of the moving and guiding members, the inclination of the optical axis of the objective lens relative to the disk surface can be adjusted in a simple manner without great increase in the number of components.

DESCRIPTION OF A PREFERRED EMBODIMENT

An embodiment of the present invention will be described hereinunder with reference to the accompanying drawings.

Figure 1:
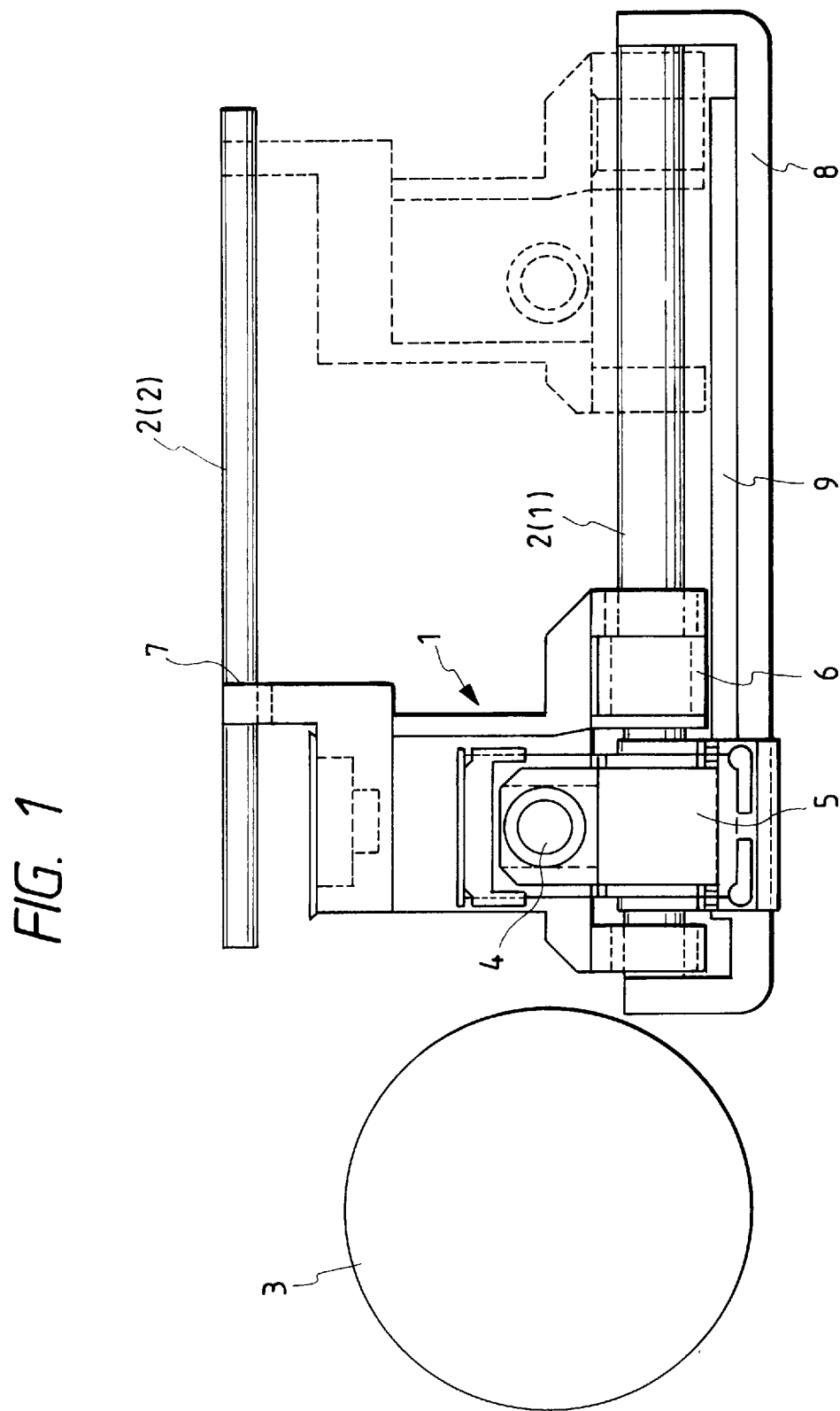
FIG. 1 is a plan view showing the construction of a pickup system according to an embodiment of the present invention.
Figure 2:
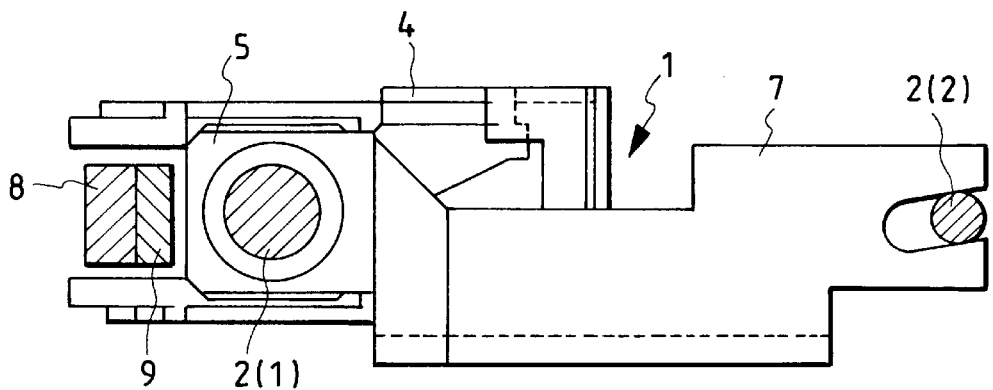
FIG. 2 is a side view showing details of the construction of a carriage illustrated in FIG. 1.

FIG. 1 is a plan view showing the construction of a pickup system according to an embodiment of the present invention, FIG. 2 is a side view showing details of the construction of a carriage illustrated in FIG. 1, and FIGS. 3A, 3B and 3C are explanatory diagrams showing in what state an engaging portion of the carriage illustrated in FIG. 2 is engaged with a second shaft.

As shown in FIG. 1, the pickup system comprises a carriage 1, a first shaft 2(1) and a second shaft 2(2), which are arranged in parallel on a chassis (not shown) and are engaged with the carriage 1, and a turntable (a disk rest portion) 3 for placing thereon an optical disk (not shown) such as, for example, CD or CD-ROM.

As shown in FIGS. 1 and 2, the carriage 1 carries thereon an optical system (not shown), including an objective lens 4, and a focus/tracking (F/T) mechanism 5. The focus/tracking mechanism 5 has a F/T coil and a magnet (neither shown). The engagement of the carriage 1 with the first shaft 2(1) is done by means of a threaded coil 6 provided on the carriage side and fitted on the first shaft, while the engagement of the carriage 1 with the second shaft 2(2) is done by means of an engaging portion 7 provided on the carriage. To both ends of the first shaft 2(1) is fixed a front end portion of a turned square U-shaped back yoke 8, and a rod-like magnet 9 is connected to the inside of a body portion of the back yoke 8. The portion including the first shaft 2(1), threaded coil 6, back yoke 8 and rod-like magnet 9 constitutes a linear motor.

As shown in FIG. 2, the engaging portion 7 provided on the carriage 1 for engagement with the second shaft 2(2) is formed with a cutout 10 which is slightly inclined relative to the disk surface. In the carriage 1 is incorporated a fine adjustment mechanism (not shown) for finely adjusting the position of the carriage. The fine adjustment mechanism can move the carriage 1 a very small distance toward the second shaft 2(2) or in the opposite direction.

The pickup system of this embodiment having the above-described construction operates in the following manner.

Figure 4:
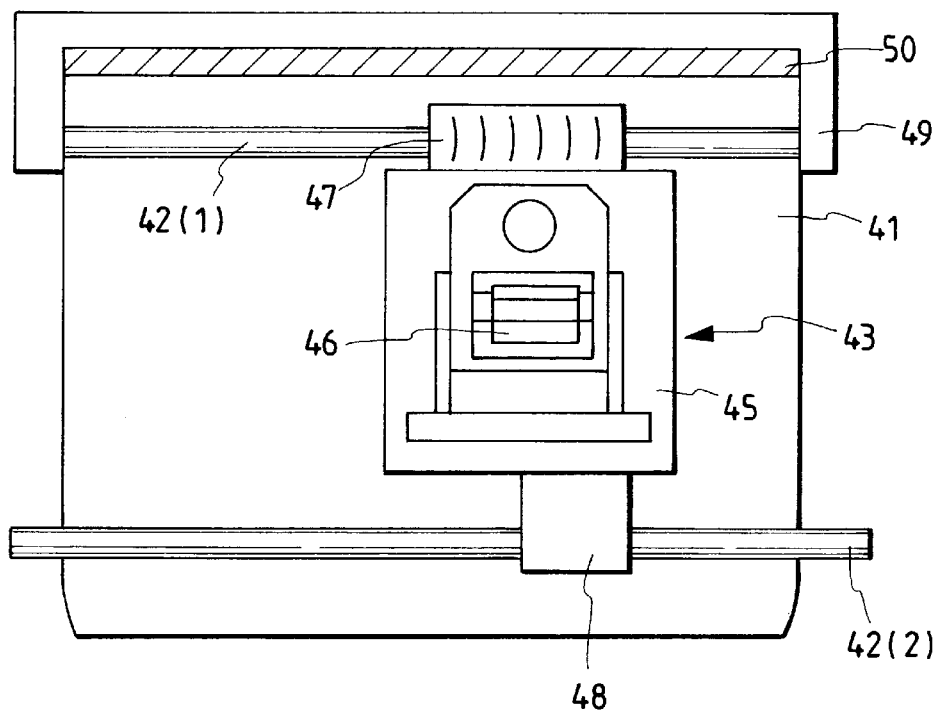
FIG. 4 is a plan view showing an example of construction of a known pickup system.
Figure 3A:
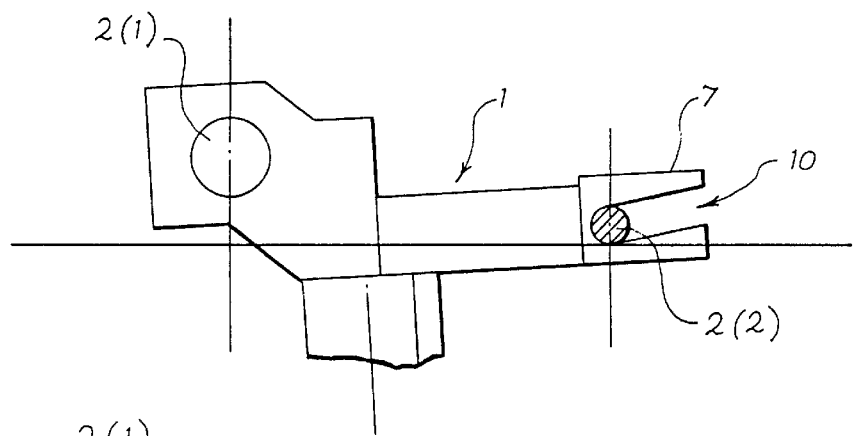
FIGS. 3A to 3C are explanatory diagrams showing in what state an engaging portion of the carriage is engaged with a second shaft.
Figure 3B:
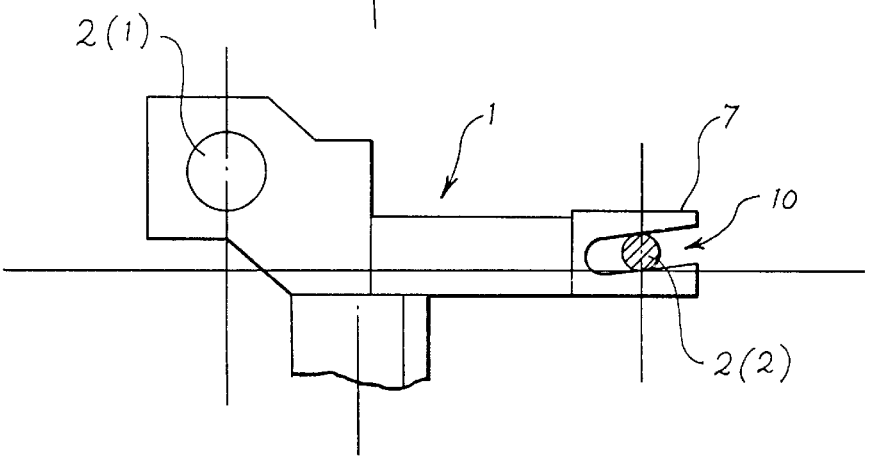
Figure 3C:
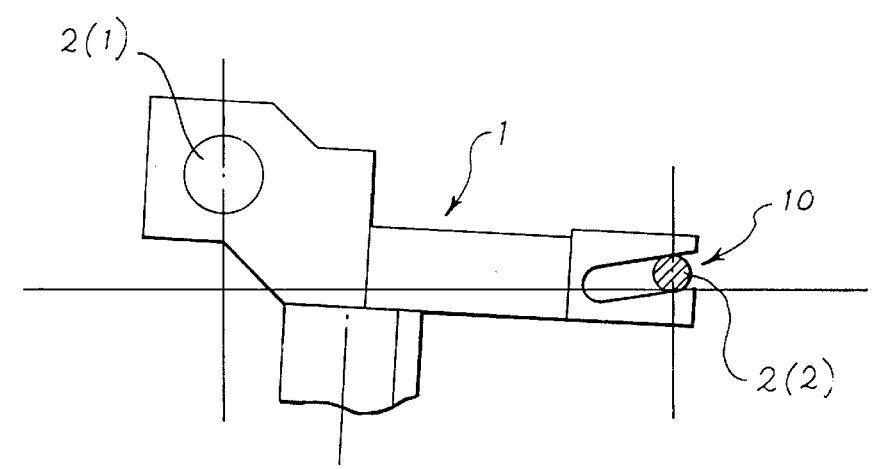

First, when an electric current is supplied to the threaded coil 6, the carriage 1 having the threaded coil 6 is moved and guided along the first and second shafts 2(1), 2(2) in accordance with the polarity of the electric current. With this movement of the carriage 1, the optical system as well as light emitting and light receiving elements (neither shown), which are carried on the carriage, move in steps (for example, in steps of 0.1 to 0.05 mm) radially of the disk placed on the turntable 3, together with the carriage. In this way there is performed a coarse feed. The carriage 1 is movable in the range of between its solid-line position and its dotted-line position both shown in FIG. 1. After this step movement, if an electric current is supplied to the F/T coil, there is performed a focus/tracking adjustment, or a fine feed, by a positional shift of the objective lens 4 in the optical system. These operations are almost the same as in the known pickup system illustrated in FIG. 4.

Next, for adjusting the inclination of the optical axis of the objective lens 4 carried on the carriage 1 relative to the disk surface on the turntable 3, an adjusting current is supplied to the fine adjustment mechanism for the carriage position incorporated in the carriage 1, allowing the carriage to move a very small distance toward the second shaft 2(2) or in the opposite direction, to adjust the position at which the second shaft 2(2) engages the engaging portion 7 of the carriage 1, that is, to adjust at which position in the cutout 10 the second shaft 2(2) is to be contacted with the cutout. Assuming that the position of the second shaft 2(2) in the cutout 10 prior to this positional adjustment is a middle position as in FIG. 3B, if the carriage 1 is inched toward the second shaft 2(2), the second shaft is in the innermost position in the cutout 10 as in FIG. 3A, so that, the carriage 1 tilts only slightly in the counterclockwise direction about the first shaft 2(1) together with the objective lens 4 and at the same time there is made an inclination adjustment for the optical axis of the objective lens. On the other hand, if the carriage 1 is inched in the direction opposite to the second shaft 2(2), the second shaft is in a position close to the inlet of the cutout 10 as in FIG. 3C, so that, the carriage tilts only slightly in the clockwise direction about the first shaft 2(1) together with the objective lens 4 and at the same time an inclination adjustment for the optical axis of the objective lens is performed in the same manner as above.

In the pickup system of this embodiment, as described above, the cutout 10, which is somewhat inclined relative to the disk surface, is formed in the engaging portion 7 of the carriage 1, and the carriage is movable a very small distance toward the second shaft 2(2) or in the opposite direction, so that the inclination of the optical axis of the objective lens 4 relative to the disk surface can be adjusted by changing the position of contact between the cutout 10 and the second shaft 2(2). Thus, it is possible to make an inclination adjustment for the optical axis of the objective lens 4 without the need of using a large number of components and without any complicated construction.

According to the pickup system of the above embodiment, moreover, since the light emitting element and the light receiving element both mounted on the carriage 1 can also be adjusted simultaneously with the inclination adjustment for the optical axis of the objective lens 4, no adverse effect is exerted on the information reading characteristic of the pickup system.

What is claimed is:

1. A pickup system comprising:
   a lens holder for holding an objective lens;
   a carriage which carries thereon said lens holder;
   a moving and guiding member for moving and guiding said carriage radially of a disk; and
   an optical axis adjusting member which adjusts the inclination of an optical axis of said objective lens relative to a surface of said disk by changing the position of said carriage relative to said moving and guiding member.

2. A pickup system according to claim 1, wherein said moving and guiding member comprises first and second shafts arranged in parallel and a drive mechanism for moving said carriage radially of the disk along said first and second shafts, and said optical axis adjusting member comprises an engaging portion of said carriage for engagement with said second shaft, said engaging portion having a cutout which is inclined relative to said disk surface, and an engaging position adjusting mechanism which causes the engaging position of said cutout with said second shaft to shift, thereby allowing said carriage to move pivotally about said first shaft to adjust the inclination of the optical axis of said objective lens.

3. A pickup system according to claim 1, wherein said carriage carries thereon a light emitting element and a light receiving element, and said light emitting element and said light receiving element turn integrally together with said objective lens upon the pivotal movement of the carriage.

* * * * *